US009838825B2

(12) United States Patent
Helwani et al.

(10) Patent No.: US 9,838,825 B2
(45) Date of Patent: Dec. 5, 2017

(54) AUDIO SIGNAL PROCESSING DEVICE AND METHOD FOR REPRODUCING A BINAURAL SIGNAL

(71) Applicant: Huawei Technologies Co., Ltd., Shenzhen (CN)

(72) Inventors: Karim Helwani, Munich (DE); Peter Grosche, Munich (DE); Yue Lang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/343,709

(22) Filed: Nov. 4, 2016

(65) Prior Publication Data

US 2017/0070838 A1 Mar. 9, 2017

Related U.S. Application Data

(63) Continuation of application No. PCT/EP2014/074536, filed on Nov. 13, 2014.

(51) Int. Cl.
| | |
|---|---|
| *H04S 7/00* | (2006.01) |
| *H04S 5/00* | (2006.01) |
| *G06F 3/01* | (2006.01) |
| *H04R 5/02* | (2006.01) |
| *H04R 5/04* | (2006.01) |
| *H04S 3/00* | (2006.01) |

(52) U.S. Cl.
CPC .............. *H04S 7/303* (2013.01); *G06F 3/012* (2013.01); *H04R 5/02* (2013.01); *H04R 5/04* (2013.01);

(Continued)

(58) Field of Classification Search
CPC .................................. H04S 7/00; H04S 3/002
(Continued)

(56) References Cited

U.S. PATENT DOCUMENTS

| 2008/0025518 A1* | 1/2008 | Mizuno | H04S 3/002 |
|---|---|---|---|
| | | | 381/17 |
| 2009/0136048 A1* | 5/2009 | Yoo | H04S 3/008 |
| | | | 381/27 |

(Continued)

FOREIGN PATENT DOCUMENTS

| CN | 1943273 A | 4/2007 |
|---|---|---|
| DE | 102007032272 A1 | 1/2009 |
| JP | 2003061197 A | 2/2003 |

OTHER PUBLICATIONS

Machine Translation and Abstract of German Publication No. DE102007032272, dated Jan. 22, 2009, 29 pages.
(Continued)

*Primary Examiner* — Melur Ramakrishnaiah
(74) *Attorney, Agent, or Firm* — Conley Rose, P.C.

(57) ABSTRACT

An audio signal processing device for generating a plurality of output signals for a plurality of loudspeakers from an input audio signal comprises a driving function determining unit adapted to determined driving functions of a plurality of loudspeakers for generating a virtual left binaural signal source and a virtual right binaural signal source based upon a position and a directivity of the virtual left binaural signal source, a position and a directivity of the virtual right binaural signal source and positions of the plurality of loudspeakers. Moreover, it comprises a filtering unit adapted to filter a left binaural signal and a right binaural signal using the driving functions of the plurality of loudspeakers resulting in the plurality of output signals. The left binaural signal and the right binaural signal constitute the input audio signal or are derived there from.

19 Claims, 17 Drawing Sheets

(52) U.S. Cl.
CPC ............. *H04S 3/008* (2013.01); *H04S 5/005* (2013.01); *H04S 7/00* (2013.01); *H04S 7/30* (2013.01); *H04S 7/305* (2013.01); *H04R 2499/11* (2013.01); *H04S 3/00* (2013.01); *H04S 2400/01* (2013.01); *H04S 2420/01* (2013.01)

(58) Field of Classification Search
USPC .......................... 381/1, 17–18, 27, 300, 303
See application file for complete search history.

(56) References Cited

U.S. PATENT DOCUMENTS

2011/0116638 A1    5/2011  Son et al.
2014/0321679 A1*  10/2014  Corteel ..................... H04S 7/30
                                                          381/300

OTHER PUBLICATIONS

Blauert, J., et al., "Binaural Signal Processing," 17th International Conference on Digital Signal Processing (DSP), Jul. 6-8, 2011, 11 pages.

Menzel, D., et al., "The Binaural Sky: A Virtual Headphone for Binaural Room Synthesis," 2005, 6 pages.

Dr. Ziada, S., "Fundamentals of Acoustics," Mech. Eng. 742, Fall of 2010-2011, 3 pages.

Bauer, B., et al., "Phasor Analysis of Some Stereophonic Phenomena," IRE Transactions on Audio, Jan.-Feb. 1962, pp. 18-21.

Duda, R., et al., "Range dependence of the response of a spherical head model," J. Acoust. Soc. Am. 104 (5), Nov. 1998, pp. 3048-3058.

Theile, G., "Neue Anwendung der Wellenfeldsynthese: Binaural Sky," XP001545649, vol. 61, No. 10, Oct. 2007, 4 pages.

English Translation of Theile, G., "Neue Anwendung der Wellenfeldsynthese: Binaural Sky," XP001545649, vol. 61, No. 10, Oct. 2007, 4 pages.

Foreign Communication From a Counterpart Application, Chinese Application No. 201480077618.6, Chinese Search Report dated May 19, 2017, 2 pages.

Foreign Communication From a Counterpart Application, Chinese Application No. 201480077618.6, Chinese Office Action dated May 27, 2017, 10 pages.

Foreign Communication From a Counterpart Application, PCT Application No. PCT/EP2014/074536, International Search Report dated Sep. 7, 2015, 5 pages.

Foreign Communication From a Counterpart Application, PCT Application No. PCT/EP2014/074536, Written Opinion dated Sep. 7, 2015, 7 pages.

* cited by examiner

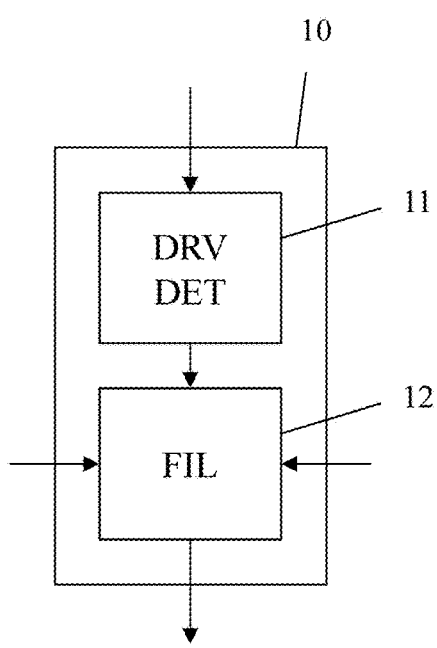
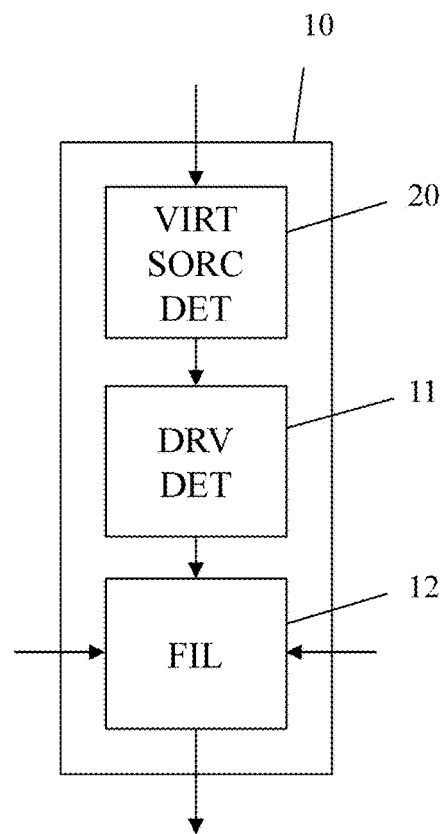
Fig. 1                    Fig. 2

AUDIO SIGNAL PROCESSING DEVICE AND METHOD FOR REPRODUCING A BINAURAL SIGNAL

CROSS-REFERENCE TO RELATED APPLICATION

This application is a continuation of International Application No. PCT/EP2014/074536, filed on Nov. 13, 2014, which is hereby incorporated by reference in its entirety.

TECHNICAL FIELD

The application relates to generating a binaural signal and projecting it to a user location using a plurality of loudspeakers.

BACKGROUND

In recent years, the use of binaural signals in headphones has become a standard practice. By using binaural signals, which are two channel signals consisting of a left channel corresponding to the left binaural signal intended for the left ear of a listener and a right channel corresponding to the right binaural signal intended for the right ear of a listener, it is possible to give a user a directional sensation although only a single loudspeaker is used for each ear of the user. The use of binaural signals in headphones though poses the disadvantage of the user having to wear headphones, which limits the user's mobility, can be strenuous, and is uncomfortable.

Also, the use of soundfield synthesis has been used for quite a while now. By use of soundfield synthesis, virtual sound sources can be placed within an area surrounded by a plurality of loudspeakers. The use of soundfield synthesis is disadvantageous, since a great number of loudspeakers is needed. Furthermore, different users within the area of the projected sound field do not hear the same sound. Dependent upon the position of the individual user within the sound field, different sounds are perceived. Especially, the sound field is not limited in its auditory reach. Every person within the sound field perceives the auditory information.

SUMMARY

Accordingly, the object of the present application is to provide an apparatus and method, which allow at least one user to perceive directional audio information while at the same time keeping disturbance to others to a minimum.

A first aspect of the present application provides an audio signal processing device for generating a plurality of output signals for a plurality of loudspeakers from an input audio signal comprises a driving function determining unit adapted to determine driving functions of a plurality of loudspeakers for generating a virtual left binaural signal source and a virtual right binaural signal source based upon a position and a directivity of the virtual left binaural signal source, a position and a directivity of the virtual right binaural signal source and positions of the plurality of loudspeakers. Moreover, it comprises a filtering unit adapted to filter a left binaural signal and a right binaural signal using the driving functions of the plurality of loudspeakers resulting in the plurality of output signals. The left binaural signal and the right binaural signal constitute the input audio signal or are derived therefrom. It is thereby possible to project the input audio signal in form of a binaural signal to a user position, thereby allowing the user to perceive the input audio signal in a directional manner and at the same time preventing others from being disturbed by the sound.

In a first implementation form, the driving function determining unit is adapted to determine the driving functions based upon preset or received positions and/or directivities of the virtual left binaural signal source and the virtual right binaural signal source. It is thereby possible to position the virtual signal sources in a very flexible manner.

According to a second implementation form, the device comprises a virtual source position determining unit adapted to determine the position and/or directivities of the virtual left binaural signal source and the virtual right binaural signal source. It is thereby possible to very exactly establish, at which positions, the virtual binaural signal sources are to be placed.

According to a third implementation form, the virtual source position determining unit comprises a head tracking unit adapted to track a position and/or orientation of a user's head. The virtual source position determining unit is then adapted to determine the positions and directivities of the virtual left binaural signal source and the virtual right binaural signal source based upon the position and/or orientation of the user's head, so that the virtual left binaural signal source is directed at the user's left ear and the virtual right binaural signal source is directed at the user's right ear. Additionally or alternatively, the virtual left binaural signal source is located in proximity to the user's left ear and the virtual right binaural signal source is located in proximity to the user's right ear. Thereby, in an automatic manner, the virtual binaural signal sources can be placed at ideal locations and/or directivities close to the user's ears thereby allowing for ideal perception condition by the user and minimal disturbance of surrounding others.

According to a fourth implementation form, the head tracking unit comprises at least one visible light camera and/or at least one ultrasound sensor and/or at least one infrared light camera and/or at least one gyroscope and/or at least one magnetic sensor adapted to track the position and/or orientation of the user's head. A very accurate tracking of the user's head with low-cost standard sensors is thereby possible.

In a fifth implementation form, the driving function determining unit comprises a sound field computation unit adapted to calculate a left sound field for the virtual left binaural signal source and a right sound field for the virtual right binaural signal source as a combination of multipole sources, which correspond to the plurality of loudspeakers. Moreover, the driving function determining unit in this case comprises a time reversal unit adapted to obtain the loudspeaker driving functions by performing a time reversal calculation for each multipole source. It is thereby possible to very accurately determine the driving functions.

In a sixth implementation form, the sound field computation unit is adapted to take scattering at the user's head and/or scattering at environment objects into account, when calculating the left sound field and the right sound field. An extremely accurate determination of the driving functions is thereby possible.

According to a seventh implementation form, the device is adapted to generate the plurality of output signals from the input audio signals and at least one further input audio signal, wherein the input audio signal and the further audio signal are signals for two different users. The driving function determination unit is then adapted to determine the driving functions of the plurality of loudspeakers for generating the virtual left binaural signal source, the virtual right binaural signal source, a further virtual left binaural signal source and a further virtual right binaural signal source based upon the position and directivity of the virtual left binaural signal source, the position and directivity of the virtual right binaural signal source, a position and a directivity of the further left binaural signal source, a position at a directivity of the further virtual right binaural signal source, and positions of the plurality of loudspeakers. The filtering unit is then adapted to filter the left binaural signal, the right binaural signal, a further left binaural signal, and a further right binaural signal using the driving functions of the plurality of loudspeakers resulting in a plurality of output signals, wherein the further left binaural signal source and the further right binaural signal source constitute the further input audio signal or are derived there from. It is thereby possible to generate signals for a second user so that the users can perceive directional audio information, while surrounding others are only minimally disturbed. It is also possible to adapt the device for generating signals for more than two users.

In an eighth implementation form, the audio signal is a mono audio signal. The left binaural signal and the right binaural signal are then derived from the mono audio signal and a mono audio signal position. It is thereby possible to generate a directional sensation for a unidirectional mono audio signal.

According to a ninth implementation form, a system comprises a device according to the first aspect of the present application or one of the previously described implementation forms, an amplifier and a loudspeaker array. The device is then adapted to provide the output signals to the amplifier device, while the amplifier device is adapted to amplify the output signals. The loudspeaker array is then adapted to output the amplified output signals. It is thereby possible to generate the output signals so that only the targeted user or the targeted users can perceive the audio signals in the desired manner, while others are only minimally disturbed.

According to a tenth implementation form, the loudspeaker array comprises a plurality of loudspeakers, which are each connected to one of a plurality of amplifiers of the amplifier device. The amplifiers of the amplifier device are then each adapted to amplify a single output signal and drive the connected loudspeaker to output the output signal. A high quality audio output is thereby possible.

According to an eleventh implementation form, the plurality of loudspeakers is arranged two-dimensionally surrounding the user, or three-dimensionally surrounding the user, or two-dimensionally on one side of the user, or three-dimensionally on side of the user. A very flexible loudspeaker positioning is thereby possible.

According to a twelfth implementation form, the device, the amplifier device and the plurality of loudspeakers are comprised by a sound bar or tablet personal computer (PC) or a mobile telephone or a telepresence system. A very flexible use of the device and system is thereby possible.

According to a second aspect of the present application, an audio signal processing method for generating a plurality of audio signals for a plurality of loudspeakers from an input audio signal is provided. The method comprises determining driving functions of a plurality of loudspeakers for generating a virtual left binaural signal source and a virtual right binaural signal source based upon a position and a directivity of the virtual left binaural signal source, a position and a directivity of the virtual right binaural signal source and positions of the plurality of loudspeakers. Moreover, the method comprises filtering a left binaural signal and a right binaural signal using the driving functions of the plurality of loudspeakers resulting in a plurality of output signals, wherein the left binaural signal and the right binaural signal constitute input audio signal or are derived there from. It is thereby possible to project the input audio signal in form of a binaural signal to a user position thereby allowing the user to perceive the input audio signal in a directional manner and at the same time preventing others from being disturbed by the sound.

In a first implementation form of the second aspect of the present application, the driving functions are determined based upon preset or received positions and/or directivities of the virtual left binaural signal source and the virtual right binaural signal source. It is thereby possible to position the virtual signal sources in a very flexible manner.

According to a second implementation form of the second aspect of the application, the positions and/or directivities of the virtual left binaural signal source and the virtual right binaural signal source are determined before determining the driving functions. It is thereby possible to very exactly establish, at which positions, the virtual binaural signal sources are to be placed.

According to a third implementation form of the second aspect of the application, a position and/or orientation of a user's head is determined. The positions and directivities of the virtual left binaural signal source and the virtual right binaural signal source are determined based upon the position and/or orientation of the user's head, so that the virtual left binaural signal source is directed at the user's left ear and the virtual right binaural signal source is directed at the user's right ear. Additionally or alternatively, the virtual left binaural signal source is located in proximity to the user's left ear and the virtual right binaural signal source is located in proximity to the user's right ear. Thereby, in an automatic manner, the virtual binaural signal sources can be placed at ideal locations and/or directivities close to the user's ears thereby allowing for ideal perception condition by the user and minimal disturbance of surrounding others.

In a fourth implementation form of the second aspect, for determining the position and/or orientation of the user's head, at least one visible light camera and/or at least one ultrasound sensor and/or at least one infrared light camera and/or at least one gyroscope and/or at least one magnetic sensor are used. A very accurate tracking of the user's head with low-cost standard sensors is thereby possible.

According to a fifth implementation form of the second aspect, determining the driving functions comprises calculating a left sound field for the virtual left binaural signal source and a right sound field for the virtual right binaural signal source as a combination of multipole sources, which correspond to the plurality of loudspeakers and obtaining the loudspeaker driving function by performing a time reversal of each multipole source. It is thereby possible to very accurately determine the driving functions.

According to a sixth implementation form of the second aspect of the application, the sound field computation is performed taking scattering at the user's head and/or scattering at environment objects into account. An extremely accurate determination of the driving functions is thereby possible.

According to a seventh implementation form of the second aspect of the application, the plurality of output signals is generated from the input audio signal and at least one further input audio signal, wherein the input audio signal and the further input audio signal are signals for two different users. In this case, the driving functions of the plurality of loudspeakers are determined for generating the virtual left binaural signal source, the virtual right binaural signal source, a further virtual left binaural signal source and a further virtual right binaural signal source based upon the position and the directivity of the virtual left binaural signal source, the position and the directivity of the virtual right binaural signal source, a position and a directivity of the further virtual left binaural signal source, a position and a directivity of the further virtual right binaural signal source, and positions of the plurality of loudspeakers. The left binaural signal, the right binaural signal, a further left binaural signal and a further right binaural signal are filtered using the driving functions of the plurality of loudspeakers resulting in a plurality of output signals, wherein the further left binaural signal and the further right binaural signal constitute the further input audio signal or are derived there from. It is thereby possible to generate signals for a second user so that the user can perceive directional audio information, while surrounding others are only minimally disturbed. It is also possible to adapt the device for generating signals for more than two users.

According to an eighth implementation form of the second aspect, the input audio signal is a mono audio signal, and the left binaural signal and the right binaural signal are derived from the mono audio signal and a mono audio signal position. It is thereby possible to generate a directional sensation for a unidirectional mono audio signal.

According to a third aspect of the present application, a computer program with a program code for performing the method according to the second aspect and the implementation forms of the second aspect when the computer program runs on a computer, is provided. It is thereby possible to generate the plurality of output signals using low-cost standard computer hardware.

Generally, it has to be noted that all arrangements, devices, elements, units and means and so forth described in the present application could be implemented by software or hardware elements or any kind of combination thereof. All steps which are performed by the various entities described in the present application as well as the functionality described to be performed by the various entities or intended to mean that the respective entity is adapted to or configured to perform the respective steps and functionalities. Even if in the following description or specific embodiments, a specific functionality or step to be performed by a general entity is not reflected in the description of a specific detailed element of that entity which performs that specific step or functionality, it should be clear for a skilled person that these methods and functionalities can be implemented in respect of software or hardware elements, or any kind of combination thereof.

BRIEF DESCRIPTION OF THE DRAWINGS

The present application is in the following explained in detail in relation to embodiments of the application in reference to the enclosed drawings, in which:

FIG. 1 shows of a first embodiment of the audio processing device according to the application in a block diagram;

FIG. 2 shows a second embodiment of the audio processing device according to the application in a block diagram;

DETAILED DESCRIPTION

In FIG. 1, a first embodiment of the inventive audio signal processing device 10 is depicted. The audio signal processing device 10 comprises a driving function determining unit 11 and a filtering unit 12. The driving function determining unit 11 is adapted to determine driving functions of a plurality of loudspeakers for generating a virtual left binaural signal source and a virtual right binaural signal source based upon a position and a directivity of the virtual left binaural signal source, a position and a directivity of the virtual right binaural signal source and positions of the plurality of loudspeakers. The resulting driving functions are handed to the filtering unit 12, which is adapted to filter a left binaural signal and a right binaural signal using the driving functions of the plurality of loudspeakers resulting in the plurality of output signals.

The driving function determining unit is provided with the positions and directivities of the virtual binaural signal sources. Alternatively, the positions and directivities of the virtual binaural signal sources can be determined. This is depicted in FIG. 2.

Also, the filtering unit 12 is provided with the left binaural signal and the right binaural signal. Alternatively, the left binaural signal and the right binaural signal can be generated from at least one signal and a signal position.

In FIG. 2, a second embodiment of the inventive audio signal processing device 10 is shown. Here, the audio signal processing device 10 furthermore comprises a virtual source position determining unit 20, which determines the position and directivity of the virtual binaural signal sources. The position and directivity of the virtual binaural signal sources is handed to the driving function determining unit 11.

Figure 3:
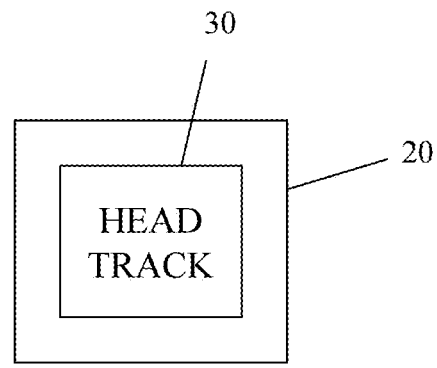
FIG. 3 shows a detail of a third embodiment of the audio processing device of the application in a block diagram.

In FIG. 3, a detail of a third embodiment of the inventive audio signal processing device is shown. Here, the internal structure of the virtual source position determining unit of FIG. 2 is shown. The virtual source determining unit 20 comprises a head tracking unit 30, which tracks a user's head position and orientation. The virtual source position determining unit 20 then determines the position and orientation of the virtual binaural signal sources based upon the position and orientation of the user's head, so that the left binaural signal source is targeted at the user's left ear and the right binaural signal source is targeted at the user's right ear. Alternatively, the left binaural signal source is located close to the user's left ear while the virtual right binaural signal source is placed close to the user's right ear.

Figure 4:
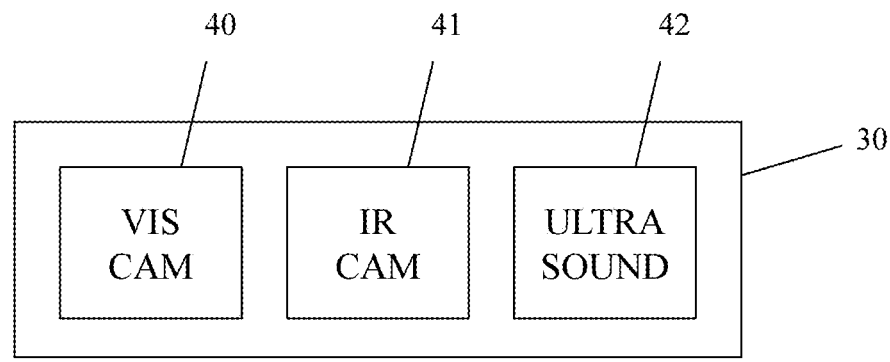
FIG. 4 shows a detail of a fourth embodiment of the audio processing device of the application in a block diagram.

In FIG. 4, a detail of a fourth embodiment of the inventive audio signal processing device is shown. Here, the internal structure of the head tracking unit 30 of FIG. 3 is shown. The head tracking unit 30 comprises at least one visible light camera 40 and/or at least one infrared light camera 41 and/or at least one ultra sound sensor 42. In the example of FIG. 4, the head tracking unit 30 comprises all three of the above-mentioned sensors. This is though not to be seen as a limitation. A head tracking unit 30 using only a single one sensor is also possible. The above-described sensors are used for determining the user's head position and orientation. Additionally or alternatively other sensors, such as gyroscopes and magnetic sensors can be used.

Figure 5:
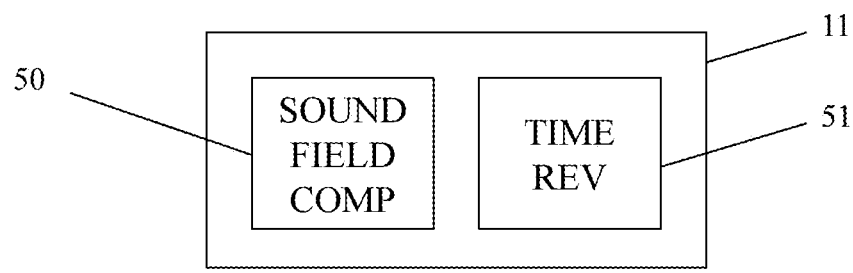
FIG. 5 shows a detail of a fifth embodiment of the audio processing device of the application in a block diagram.

In FIG. 5, a detail of a fifth embodiment of the audio signal processing device according to the present application is shown. Here, the internal structure of the driving function determining unit 11 of FIG. 2 is shown. The driving function determining unit 11 comprises a sound filed computation unit 50 and a time reversal unit 51. The sound field computation unit 50 calculates a left sound field for the virtual left binaural signal source and a right sound field for the virtual right binaural signal source as a combination of multipole sources, which correspond to the plurality of loudspeakers, the output signals are to be output by. The time reversal unit 51 then obtains the loudspeaker driving functions by performing a time reversal calculation for each multipole source.

Figure 6:
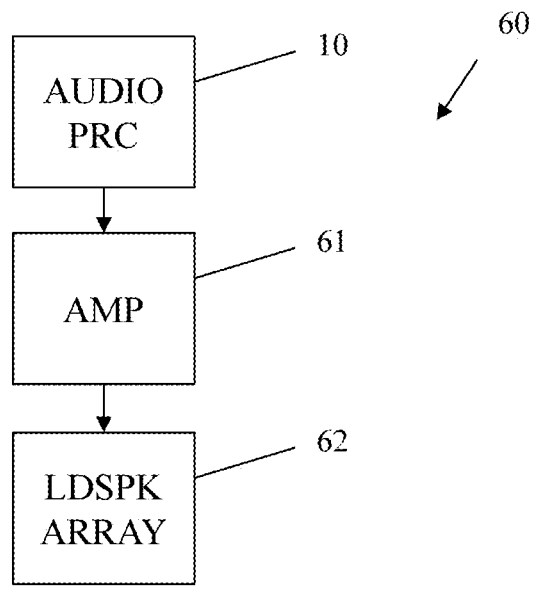
FIG. 6 shows a first embodiment of the system according to the application in a block diagram.

In FIG. 6, a first embodiment of the inventive system 60 is shown. The system 60 comprises an earlier described audio signal processing device 10, an amplifier device 61 and a loudspeaker array 62. The audio signal processing device 10 is connected to the amplifier device 61, which again is connected to the loudspeaker array 62. The audio signal processing device 10 provides the output signals to the amplifier device 61, which amplifies the output signals. The amplified output signals are then provided to the loudspeaker array 62, which outputs them.

Figure 7:
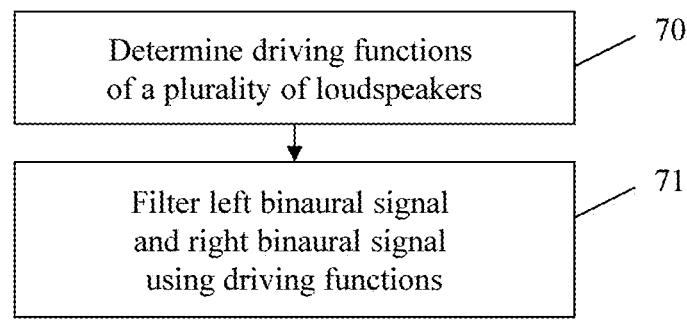
FIG. 7 shows a first embodiment of the audio signal processing method according to the application in a flow diagram.

In FIG. 7, a first embodiment of the inventive audio signal processing method is shown in a flow diagram. In a first step 70, driving functions for a plurality of loudspeakers are generated based upon a position and a directivity of a virtual left binaural signal source, a position and a directivity of a virtual right binaural signal source and positions of a plurality of loudspeakers. The driving functions fulfill the goal of generating a virtual left binaural signal source and a virtual right binaural signal source at specific positions and directivities. In a second step 71, a left binaural signal and a right binaural signal are filtered using the driving functions of the plurality of loudspeakers determined in the first step 70 resulting in a plurality of output signals, which are then output by a loudspeaker array.

Figure 8:
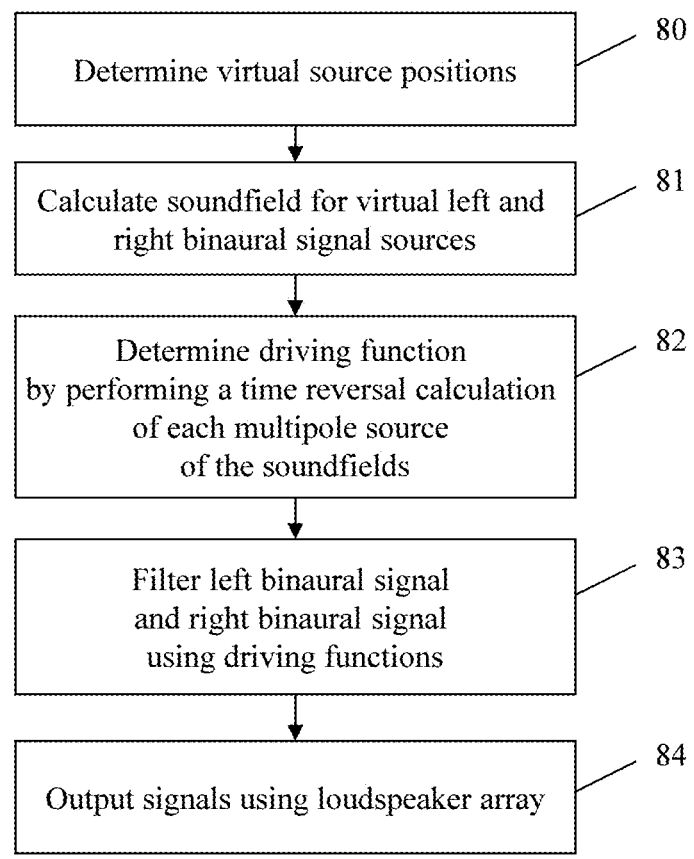
FIG. 8 shows a second embodiment of the audio signal processing method according to the application in a flow diagram.

In FIG. 8 a second, more detailed embodiment of the inventive audio signal processing method is shown in a flow diagram. In a first step 80, positions and directivities of a virtual left binaural signal source and a virtual right binaural signal source are determined. For example, this determining can include tracking a user's head position and orientation, determining the ear positions and locating the virtual left binaural signal source in proximity to and/or targeted at the user's left ear and positioning the virtual right binaural signal source in proximity to the user's right ear and/or targeted at the user's right ear. In a second step 81, a sound field for the virtual left and right binaural signal sources is calculated. In a third step 82 driving functions for a plurality of loudspeakers for generating the virtual left binaural signal source and the virtual right binaural signal source are determined by performing a time reversal calculation for each multipole source, which correspond to the individual loudspeakers. In a fourth step 83, a left binaural signal and a right binaural signal are filtered using the earlier determined driving functions. Resulting from the fourth step 83 are a plurality of output signals for the plurality of loudspeakers. In a final fifth step 84, the signals are output using a loudspeaker array.

In the following, a closer examination of the technical background and the underlying mathematics of the application are given.

Binaural signals are two-channel audio signals, e.g., a discrete stereo signal or a parametric stereo signal consisting of a mono downmix and spatial side information, which capture the entire set of spatial cues employed by the human auditory system for localizing sound sources. Capturing the sound pressures at both ear drums of a listener as they are occurring in a real acoustic scene, when presenting a binaural signal to a user, a copy of the signal at the eardrums of the listener is produced as it would have been experienced at the recording location. Binaural signals may be generated using suitable transfer functions, such as head related transfer functions (HRTFs) in the frequency domain or impulse responses, such as Head-related impulse responses (HRIR) or binaural room impulse responses (BRIR) in the time domain or may be recorded using a suitable recording device such as a dummy head or in-ear microphones.

Figure 9:
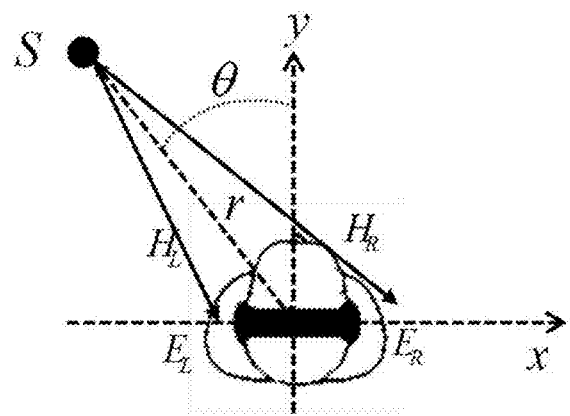
FIG. 9 shows an overview of a head model.

For example, referring to FIG. 9, an acoustic source S, e.g., a person or a music instrument or even a mono loudspeaker, which generates an audio source signal S is perceived by a user or listener at the left ear as left ear entrance signal or left ear audio signal EL and at the right ear as right ear entrance signal or right ear audio signal ER. The corresponding transfer functions for describing the transmission channel from the source S to the left ear EL and to the right ear ER are, for example, the corresponding left and right ear head related transfer functions HRTFs, depicted as HL and HR in FIG. 9.

Analogous, as shown in FIG. 9, to create the perception of a virtual source S positioned at the position $(r,\theta,\phi)$ in spherical coordinates to a listener placed at the origin of the coordinate system, the source signal S can be filtered with the HRTFs $H(r,\theta,\phi)$ corresponding to the virtual source position and the left and right ear of the listener to obtain the ear entrance signals E, i.e. EL and ER:

$$\begin{pmatrix} E_L \\ E_R \end{pmatrix} = \begin{pmatrix} H_L \\ H_R \end{pmatrix} S.$$

In other words, by selecting the appropriate HRTF based on r, θ and φ for the desired virtual position of an audio source S, any audio source signal S can be processed such that it is perceived by the listener as being positioned at the desired position, e.g. when reproduced via headphones or earphones.

One important requirement for the correct reproduction of the binaural localization cues produced in that way is that the ear signals E are reproduced at the eardrums of the listener which is naturally achieved when using headphones, as depicted in FIG. 9 or earphones. Both, headphones and earphones have in common that they are located directly on the ears or a located even in the ear and that the membranes of the loudspeaker comprised in the headphones or earphones are positioned such that they are directed directly towards the eardrum. In many situations, however, wearing headphones is not appreciated by the listener as these may be uncomfortable to wear or they block the ear from environmental sounds. Furthermore, many devices, including mobile devices such as mobile telephones though include loudspeakers.

For the presentation of binaural signals to the user, it is a necessity to ensure that each channel is presented independently, without any crosstalk. Crosstalk refers to the undesired case that a part of the signal which is recorded at the right ear drum of the listener is presented to the left ear, and vice versa. Preventing crosstalk is naturally achieved when presenting binaural signals using conventional headphones.

A presentation using conventional loudspeakers therefore requires a means to actively cancel the undesired crosstalk using a suitable processing which avoids that a signal produced by the left speaker reaches the right eardrum and vice versa. Binaural signals presented without crosstalk can provide a fully immersive three-dimensional (3D) listening experience, where the positions of sound sources are not limited but basically span the entire 3D space around the listener.

For example, using a conventional pair of loudspeakers for reproducing binaural signals at the listener's ears requires solving the cross-talk problem, which does naturally not occur when the binaural signals are reproduced over headphones because the left ear signal EL is directly and only reproduced at the left ear and the right ear signal ER is directly and only reproduced at the right ear.

Figure 10:
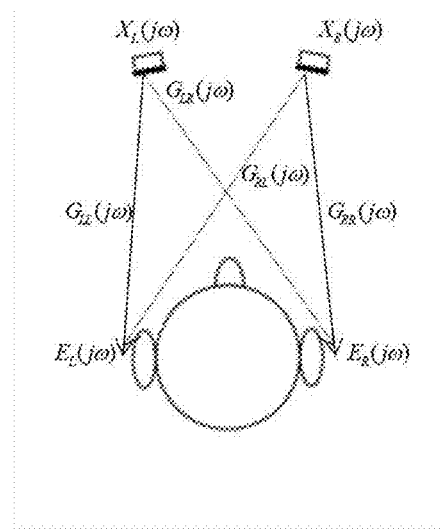
FIG. 10 shows transmission functions in an overview of a head model.

By means of a cross-cancellation technique, for desired left and right ear entrance signals EL and ER, corresponding loudspeaker signals are computed. When a pair of (remote) left and right stereo loudspeakers plays back two signals, $X_L(j\omega)$ and $X_R(j\omega)$, a listener's left and right ear entrance signals, $E_L(j\omega)$ and $E_R(j\omega)$, can be modeled as:

$$\begin{pmatrix} E_L(j\omega) \\ E_R(j\omega) \end{pmatrix} = \begin{pmatrix} G_{LL}(j\omega) & G_{LR}(j\omega) \\ G_{RL}(j\omega) & G_{RR}(j\omega) \end{pmatrix} \begin{pmatrix} X_L(j\omega) \\ X_R(j\omega) \end{pmatrix}, \quad (1)$$

where $G_{LL}(j\omega)$ and $G_{RL}(j\omega)$ are the transfer functions from the left and right loudspeakers to the left ear, and $G_{LR}(j\omega)$ and $G_{RR}(j\omega)$ are the transfer functions from the left and right loudspeakers to the right ear. $G_{RL}(j\omega)$ and $G_{LR}(j\omega)$ represent the undesired crosstalk paths which need to be cancelled in order to correctly reproduce the desired ear entrance signals $E_L(j\omega)$ and $E_R(j\omega)$. This is depicted in FIG. 10.

In vector matrix notation (1) is:

$$E = GX, \text{ with} \quad (2)$$

$$E = \begin{pmatrix} E_L(j\omega) \\ E_R(j\omega) \end{pmatrix}$$

$$G = \begin{pmatrix} G_{LL}(j\omega) & G_{LR}(j\omega) \\ G_{RL}(j\omega) & G_{RR}(j\omega) \end{pmatrix}$$

$$X = \begin{pmatrix} X_L(j\omega) \\ X_R(j\omega) \end{pmatrix}.$$

A straightforward way of solving this problem would be to apply a crosstalk cancellation technique based on filter inversion. Where the loudspeaker signals X corresponding to given desired ear entrance signals E are obtained by inverting the transfer function G.

$$X = G^{-1} E, \quad (4)$$

Figure 11:
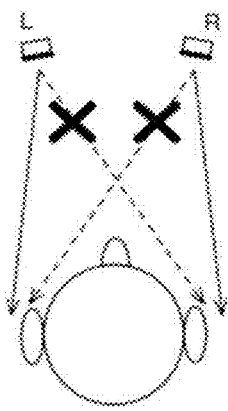
FIG. 11 shows an overview of crosstalk cancellation in a head model.

Such an approach is depicted in FIG. 11. However this technique remains difficult to implement successfully since it invokes an inversion of matrices which may often be ill-conditioned. Matrix inversion would result in impractically high filter gains, which cannot be used in practice. A very large dynamic range of the loudspeakers would be needed and a high amount of acoustic energy would be radiated to areas other than the two ears of the user.

Alternatively, loudspeaker array based soundfield synthesis can be adapted. Soundfield synthesis typically aims at the creation of an analytically given soundfield in a large listening area. The reproduction is usually targeted at providing a spatial auditory event homogenously for a larger audience and not only to one individual.

A first approach which uses loudspeaker array based soundfield synthesis for the presentation of binaural signals to a listener is a system called binaural sky. Here, the idea is to synthesize two virtual point sources at the listener's ears. One virtual point source is presenting the first channel of the binaural signal to the left ear, the second point source is presenting the second channel of the binaural signal to the right ear.

Using a circular array of loudspeakers above the head of the listener together with a means to track the rotation of the listener, the system is able to achieve a stable localization of virtual sources even when the listener rotates his head.

The drawbacks of this approach are that it cannot deal with movements of the listener who has to stay in the center of the array, the sweet spot, and that it does not consider the scattered soundfield caused by the listener head, i.e., it is based on a free-field assumption which does only hold until the listener enters the sweet spot. This approach is furthermore disadvantageous, since others except from the user can hear a distorted version of the sound.

Apart from cross-talk cancellation by filter-inversion, another promising approach for the spatial reproduction of binaural signals is beamforming. The technique of beamforming is sometimes used in disciplines like radar or satellite communications, and in the field of acoustics is sometimes applied for recording acoustic scenes using microphone arrays. Here, instead of capturing sounds originating from a desired direction, sound waves should be emitted to certain directions only in order to focus the acoustic energy to a certain direction via loudspeaker beamforming. Creating two independent beams where the first beam corresponding to the first channel of the binaural signal is pointing towards the position of the left ear of the listener and the second beam corresponding to the second channel of the binaural signal is pointing towards the position of the left ear of the listener. The advantage of this approach is that the use of beamformers minimizes the environmental disturbances as most of the energy is directed towards the position of the listener's ears. However, there exists a strong dependency of the directional selectivity of the beamformer on properties of the loudspeaker array, especially the size and number of speakers. Furthermore, it is based on a free-field assumption and does not consider the scattering caused by the body of the user and environment objects.

Figure 12:
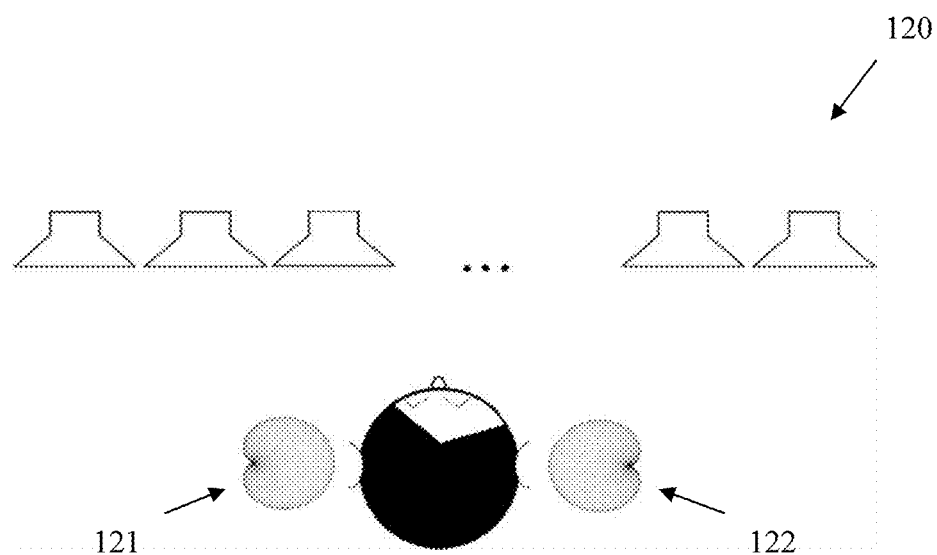
FIG. 12 shows virtual binaural signal sources generated by a loudspeaker array.

In FIG. 12, a synthesis of a left binaural signal and a right binaural signal by use of a loudspeaker array 120 is depicted. The left binaural signal is placed at a virtual left binaural signal source 121, which is located in proximity to a user's left ear and directed at the user's left ear, while the right binaural signal is placed at virtual right binaural signal source 122, which is located in proximity to the user's right ear and directed at the user's right ear. Directional sources can be achieved by a superposition of multipole sources. The sound source is either a directional focused point source or a focused extended source acting as a virtual array that is performing some beamforming technique as will described in the following subsection.

Synthesis of Focused Directional Point Sources:

For the reproduction of unrestricted audio content, a filter, preferably, a finite impulse response filter (FIR) is implemented such that in every discrete frequency bin the desired directivity is achieved. The chosen number of the frequency bins depends on the available computational resources but it also influences the performance of the calculated filters. The frequency range for the calculation is chosen according to the temporal sampling rate and should cover regularly all frequency bins up to the Nyquist frequency. E.g., for a sampling frequency of 44100 hertz (Hz) and a desired filter length of 1024 taps, 512 frequency bins have to be considered, these should uniformly discretize the frequency range up to 22050 Hz. If the further processing is not performed in the frequency domain, the time domain representation of the filter could be obtained by an Inverse Fast Fourier Transform (IFFT)-block.

A typical description of a soundfield is done by means of orthogonal functions that solve the wave equation. According to the system of coordinates in which the wave equation is expressed and separated, the soundfield is typically represented by means of plane waves in a Cartesian system of coordinates, cylindrical or spherical waves in cylindrical or spherical coordinates respectively. Cylindrical and spherical waves are separated into independent radial and angular components. For the analytical derivation of the filters we expand the soundfield of the focused source by means of the orthogonal basis functions that solve the wave homogeneous equation in the corresponding system of coordinates, i.e., cylindrical for a 2 dimensional setup or spherical in 3 dimensional setup. The soundfield at a position $r=[r,\phi,\theta]$ due to a desired directive source into a direction $[\phi_0,\theta_0]$ is given as:

$$P(k, r) = \sum_{n=0}^{N} \sum_{m=-n}^{n} i^n j_n(kr) Y_n^m(\theta_0, \phi_0) Y_n^m(\theta, \phi),$$

with i denoting the complex unity, $Y_n^m$ denoting the spherical harmonics of the order n,m, $j_n$ denoting the spherical Bessel function of first kind, and $$k := \frac{\omega}{c}$$

is the wave number with c standing for the sound speed.

The same expansion with a different desired direction can be done for the other source. Since up to now, the expansion has been done with respect to different origins, a translation of the origins to a common origin, preferably, the center of the circular loudspeaker array but it can be also arbitrarily chosen point.

The translation is done by exploiting the invariance of the sound pressure at one point with respect to the expansion coordinates.

The pressure of the desired focused source is then calculated at the positions of the loudspeakers by assuming a free field Green's function. The driving functions of the loudspeakers are then calculated such that the time inverted sound field is emitted. According the high frequency approximation of the Kirchhof-Helmholtz integral the driving functions are the normal derivative of the sound pressure at the loudspeaker positions and the time reversal can be obtained in the frequency domain by applying a conjugation $$D(r_s) = a(r_s) \frac{\partial P^*(r_s, \omega)}{\partial n},$$

where $\alpha(r_s)$ denotes an optional window function for the selection of the secondary sources and $\{\cdot\}^*$ denotes a conjugation and is realizing the time reversal cavity.

Synthesis of Focused Directional Extended Sources:

For the synthesis of focused directional extended sources, the extended source is approximated by a distribution of focused point sources, e.g., the distribution could be a linear distribution and to achieve the directivity, a beamformer is applied on the virtual point sources. This could be a delay-and-sum beamformer, where the signal at every virtual point source is delayed such that the resulting wave front is perpendicular to a desired steering direction.

Incorporation of a Head Model:

The synthesis incorporates ideally a model for the scattered field by the listener head due to a multipole, such that the scattered field is compensated.

The scattered and incident field of the desired directive virtual sources near the listener's ears is used to calculate the loudspeaker signals.

The derivation is done analytically by exploiting the time reversal cavity.

A numerical derivation by minimizing the reproduction error should be also covered by the patent as alternative implementation.

Numerical calculation of the Synthesis Filters:

The numerical optimization is multiple point based and can be based on measured or synthesized impulse responses in the presence of a dummy head or a head model. For the measurements, preferably, a concentrated spherical loudspeaker is placed at the desired position of the directional focused sources. The loudspeaker arrays is emitting a directive known test sequence (e.g., a logarithmic sweep) the directivity is preferably achieved by employing a modal beamforming technique. A scattering object, e.g., a dummy head, could be placed next to the concentrated spherical loudspeaker array. The microphones to record the test sequence are placed around the listening area at the positions where the reproduction loudspeaker will be later placed.

The cost function to be minimized with respect to the loudspeaker signal is preferably, the mean squared error between the captured microphone signal at the position of the desired virtual source and an idealized signal that would be obtained under free field conditions.

The needed inversion operations needed for the computation of the filters are preferably regularized using a frequency dependent scheme.

The filters are calculated offline and saved in a lookup table or computed online depending on the user's position.

Figure 13:
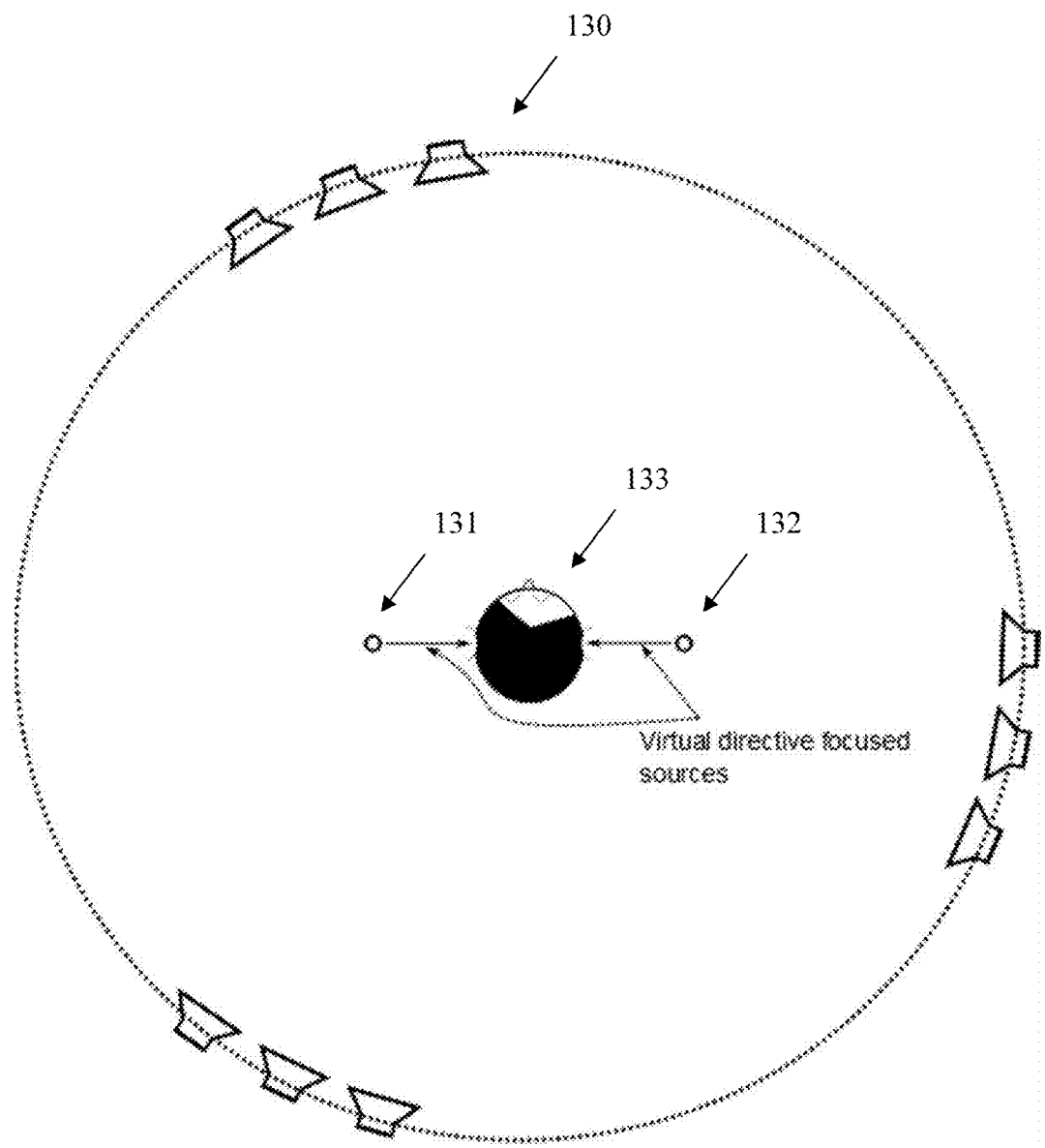
FIG. 13 shows an arrangement of a loudspeaker array around a user head.

In FIG. 13, an exemplary setup with a possible placement of virtual sources 131, 132 around a user's head 133 by use of a loudspeaker array 130 is depicted. Here, only two virtual sources are placed in proximity to the user's ears. The virtual sources are directed at the respective ear.

Figure 14:
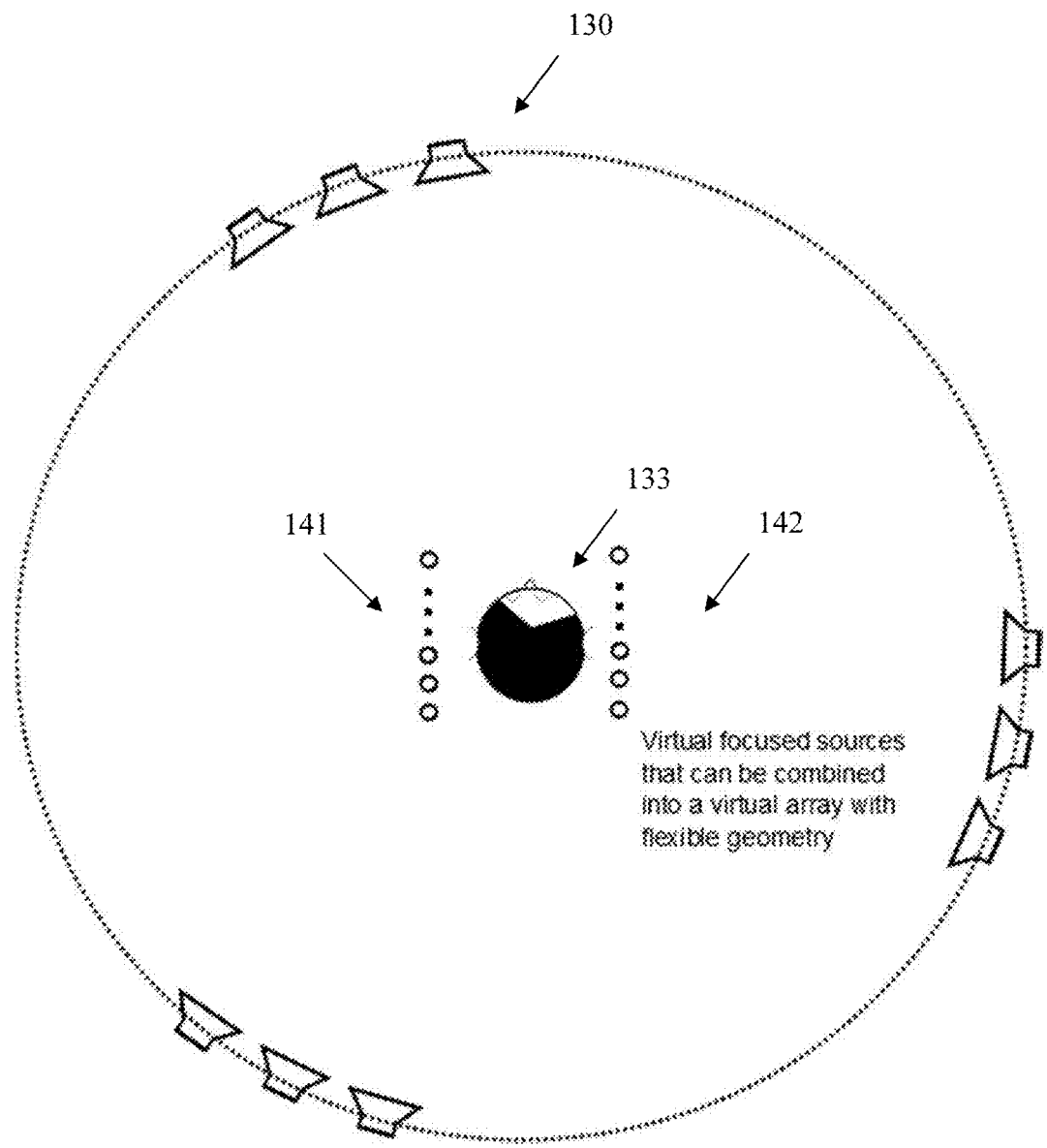
FIG. 14 shows a further arrangement of a loudspeaker array around a user head.

In FIG. 14, an alternative exemplary setup with a possible placement of virtual sources 141, 142 around a user's head 133 by use of a loudspeaker array 130 is depicted. Here, a number of virtual sources are placed in proximity to each of the user's ears. The virtual sources are unidirectional, here.

Figure 15:
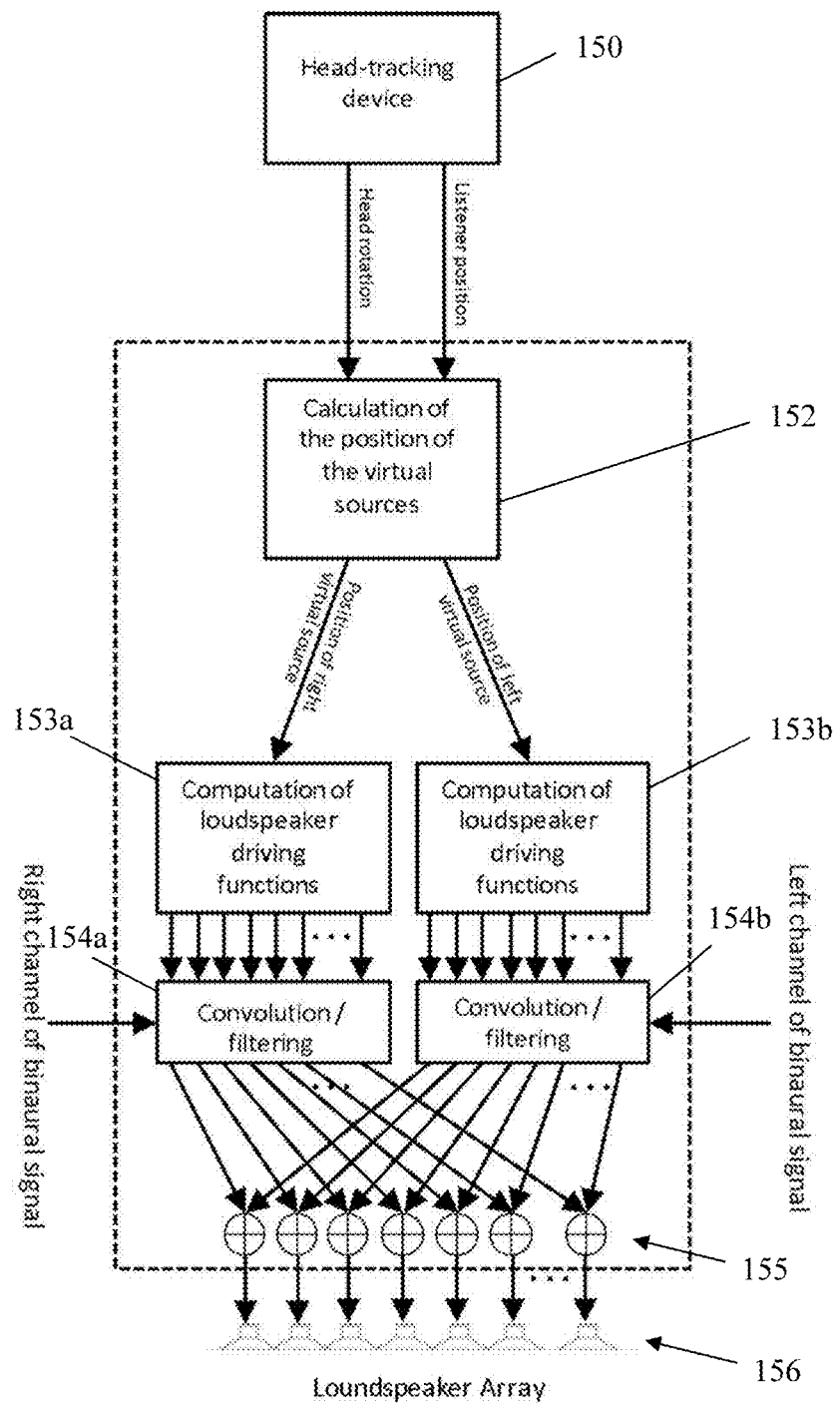
FIG. 15 shows a sixth embodiment of the audio signal processing device according to the application.

In FIG. 15, a further exemplary embodiment of the audio signal processing device is depicted. Based on the position of listener and the orientation of the head, which may be predefined (static), manually specified by the listener, or automatically determined by a head-tracking device 150, for example a motion tracking device using suitable sensors such as optical, gyroscopic, or magnetic sensors, in a first step, the needed position of the virtual sources are determined based on an estimate of the position of the listener's ears. The virtual sources are pointing towards the listener's ears. The left virtual source is positioned close to and directed towards the left ear of the listener, the right virtual source is positioned close to and directed towards the right ear of the listener. The positioning of the virtual sources is performed by a position calculation unit 152.

Based on the position of the virtual sources and the geometric setup of the loudspeaker array, an optimal loudspeaker driving function, for example an impulse response is computed for each loudspeaker corresponding to the left and right virtual source by a driving function determination unit, which in this embodiment is divided into two partial driving function determination units 153a, 153b.

Given all loudspeaker driving functions corresponding to the left virtual source, the left channel of the binaural signal to be presented to the listener is convolved with the loudspeaker driving functions to obtain the signals which are played over each loudspeaker. The right channel of the binaural signal is convolved with all loudspeaker driving functions corresponding to the right virtual source. This filtering is performed by a filtering unit, which in this exemplary embodiment is comprised by two partial filtering units 154a, 154b.

Finally, the resulting loudspeaker signals corresponding to the left virtual source and the right virtual source are summed up in a summation unit 155, optionally amplified by a non-depicted amplifying unit and then output by a loudspeaker array 156.

Figure 16:
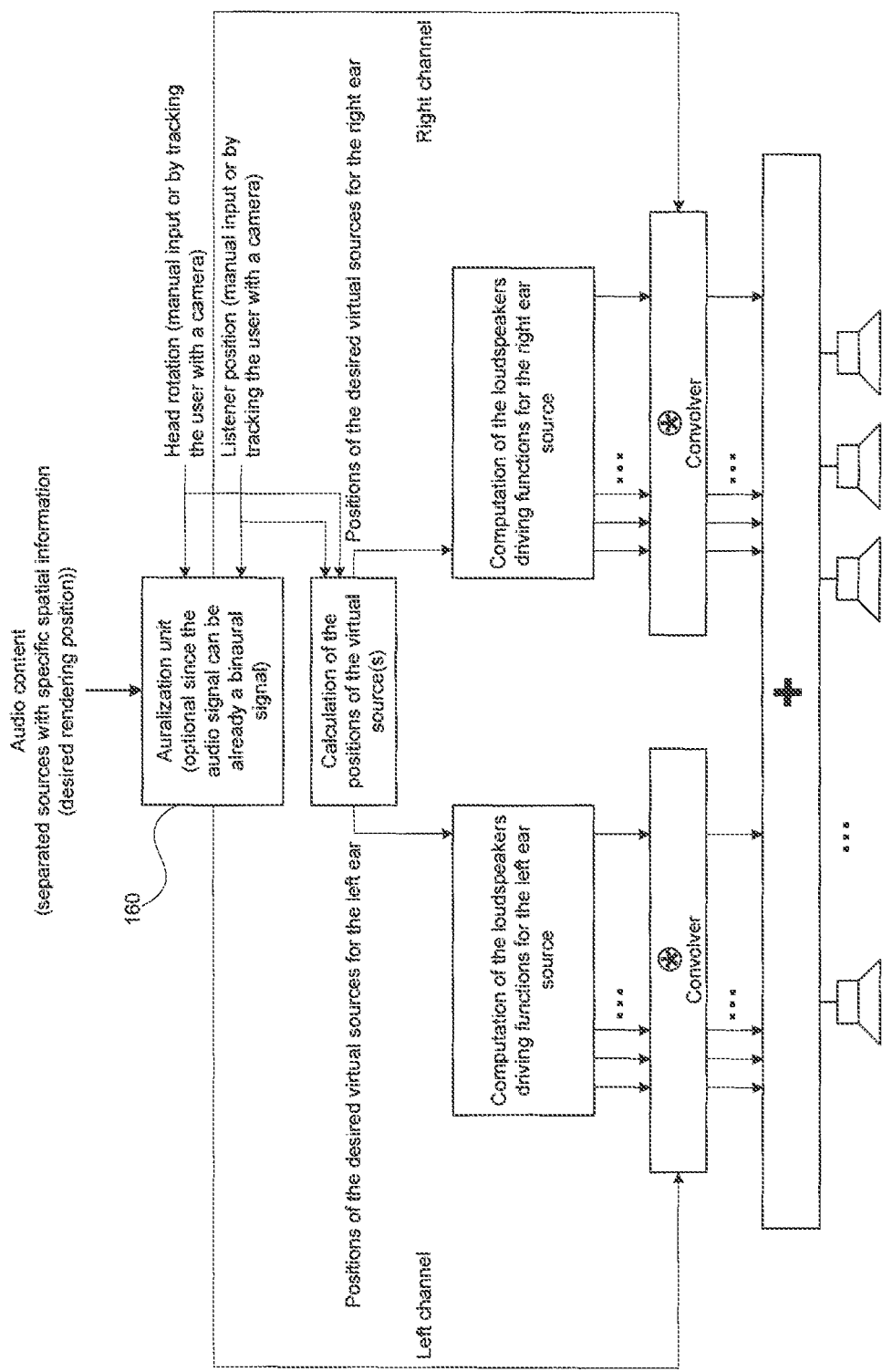
FIG. 16 shows a seventh embodiment of the audio signal processing device according to the application.

In FIG. 16, a further embodiment of the inventive audio signal processing device is shown. Here, an auralization unit 160 performs a preprocessing of the audio signals and the desired spatial locations of the audio signals taking the user's head position and orientation into account. The resulting information is processed as depicted in FIG. 15.

Figure 17:
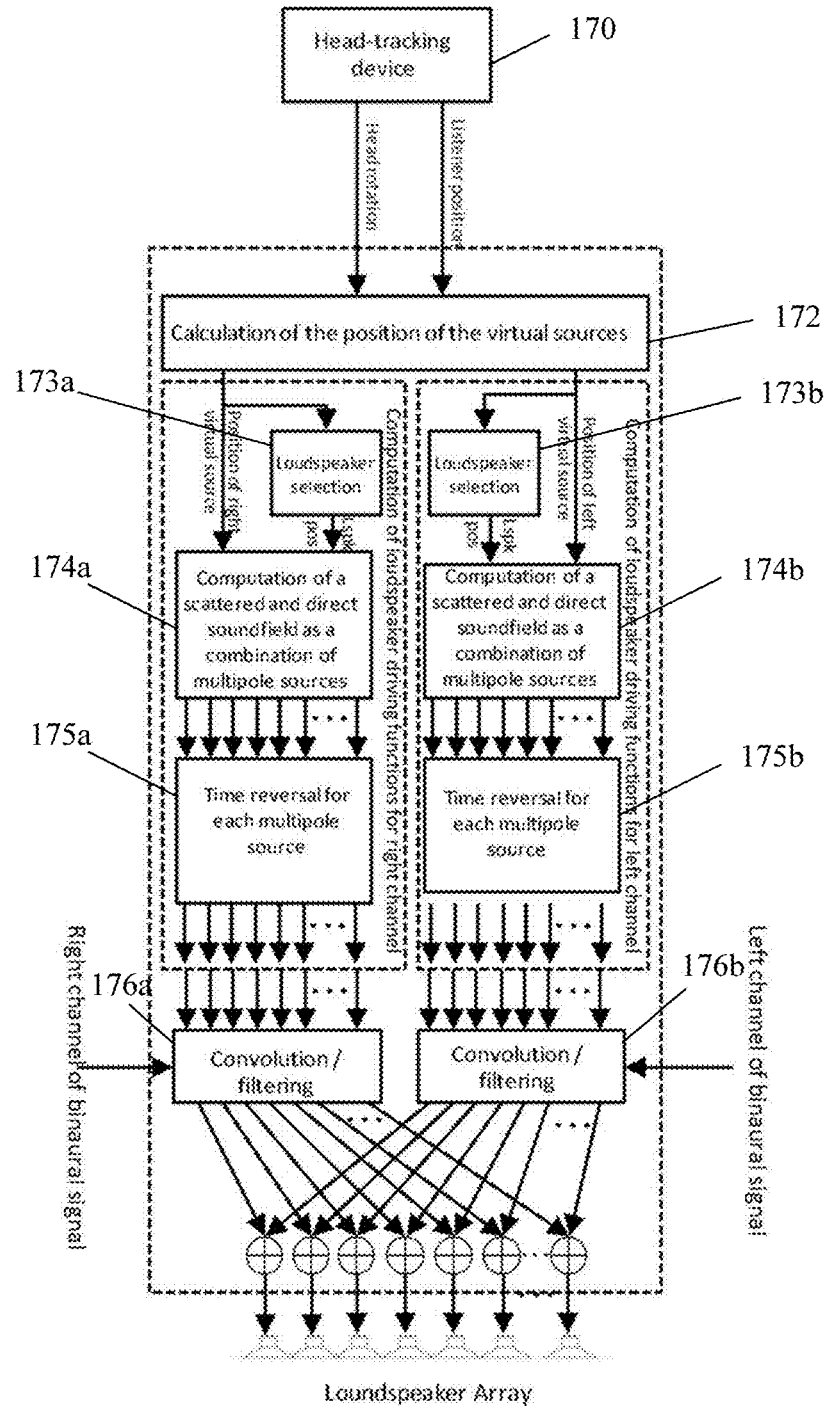
FIG. 17 shows an eighth embodiment of the audio signal processing device according to the application.

FIG. 17 shows a further embodiment of the inventive audio signal processing device. The focus of this embodiment is the computation of the loudspeaker driving functions for the left and right virtual sources. As earlier explained, the position and orientation of the user's head is tracked by a head tracking unit 170. The positions and directivities of the virtual sources are then calculated by a virtual source position determining unit 172. Given the positions of the left and right virtual sources, the optimal set of loudspeakers is selected based on the geometry of the array by a loudspeaker selection unit, which is depicted here as a two-part loudspeaker selection unit 173a, 173b. The positions of the loudspeakers and the positions of the virtual sources are then used to compute the scattered and direct soundfield by a two-part sound field computation unit 174a, 174b. These sound fields are considered as a combination of multipoles, which correspond to the individual loudspeakers of a loudspeaker array 178. Finally, the loudspeaker driving functions are obtained by a time reversal of each multipole source by a two-part time reversal unit 176a, 176b. From there on, the further processing is identical to the earlier depicted and explained further processing.

Figure 18:
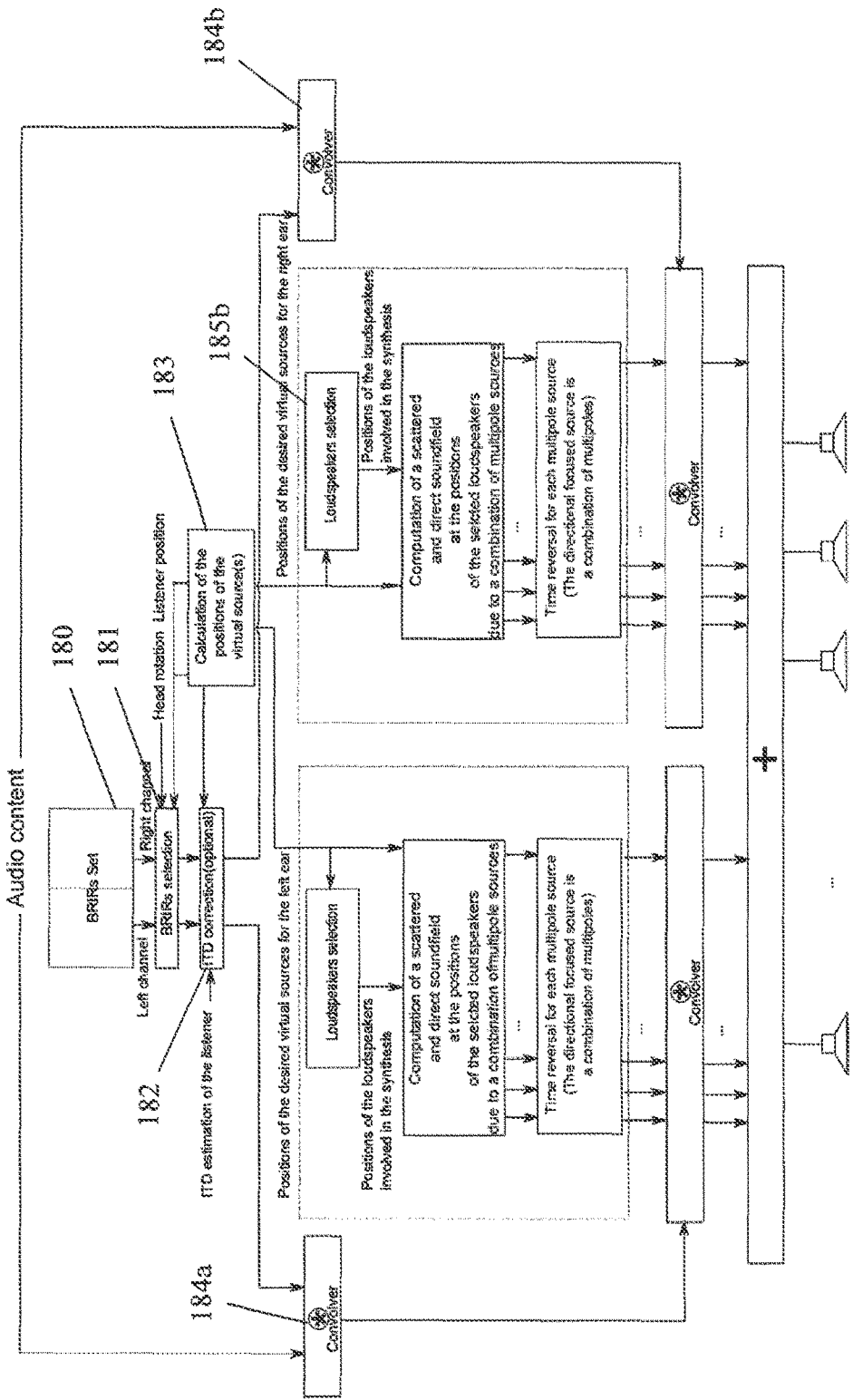
FIG. 18 shows a ninth embodiment of the audio signal processing device according to the application.

In FIG. 18, a further embodiment of the inventive audio signal processing device is shown. Here, based on a set of binaural room impulse responses (BRIR) 180, a binaural room impulse response is selected by a binaural room impulse response selection unit 181 based upon a position and orientation of the user's head. After this, an interaural time difference correction unit 182 performs an interaural time difference correction based upon an interaural time difference estimation of a listener and based upon a calculation of the positions of the virtual sources by a virtual source position determining unit 183. The audio content is then convoluted by a two-part convolution unit 184a, 184b, using the results of the interaural time difference correction. The resulting convoluted audio signals are then further processed as described and shown in FIGS. 15-17 regarding the audio content.

Figure 19:
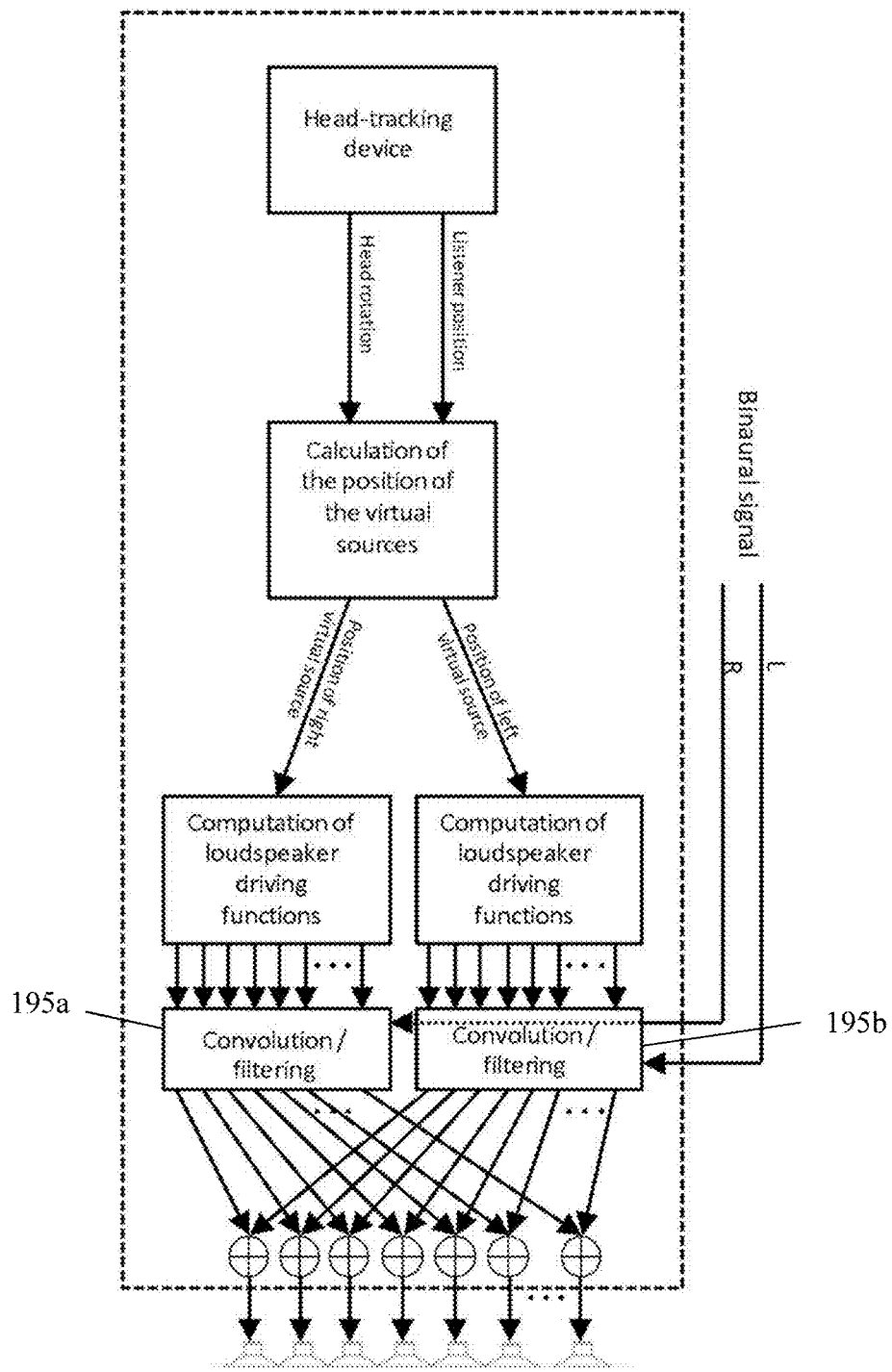
FIG. 19 shows a tenth embodiment of the audio signal processing device according to the application.

In the following a number of use cases are presented in form of additional embodiments of the inventive audio processing device:

In FIG. 19, an embodiment of the inventive audio processing device used for rendering a binaural signal is presented. Here a left channel L and a right channel R of the binaural signal are directly handed to the two-part filtering unit 195a, 195b, which performs the filtering with the driving functions determined as described along the previously presented figures.

Figure 20:
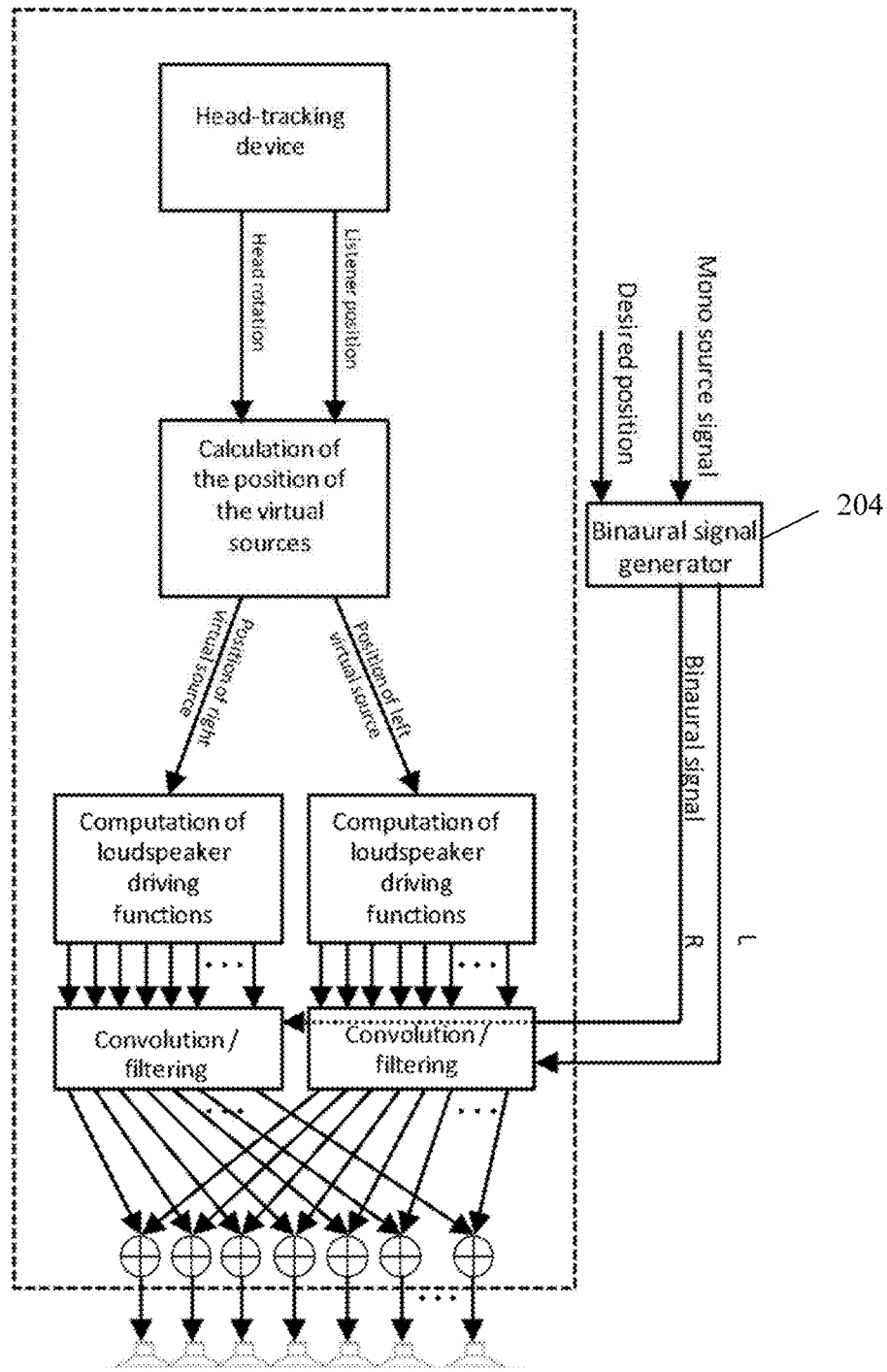
FIG. 20 shows an eleventh embodiment of the audio signal processing device according to the application.

FIG. 20 shows an embodiment of the inventive audio processing device used for rendering a mono source at a virtual position. For rendering a mono source at a virtual position, the binaural signal is generated in an auralization unit as explained in FIG. 16 based on the desired source position. The auralization unit 160 of FIG. 16 corresponds to the binaural signal generator 204 of FIG. 20. Optionally, the head rotation information can be used to adapt the binaural signals to changes of the orientation of the head of the listener. Apart from this, the processing is identical to the earlier described embodiments.

Figure 21:
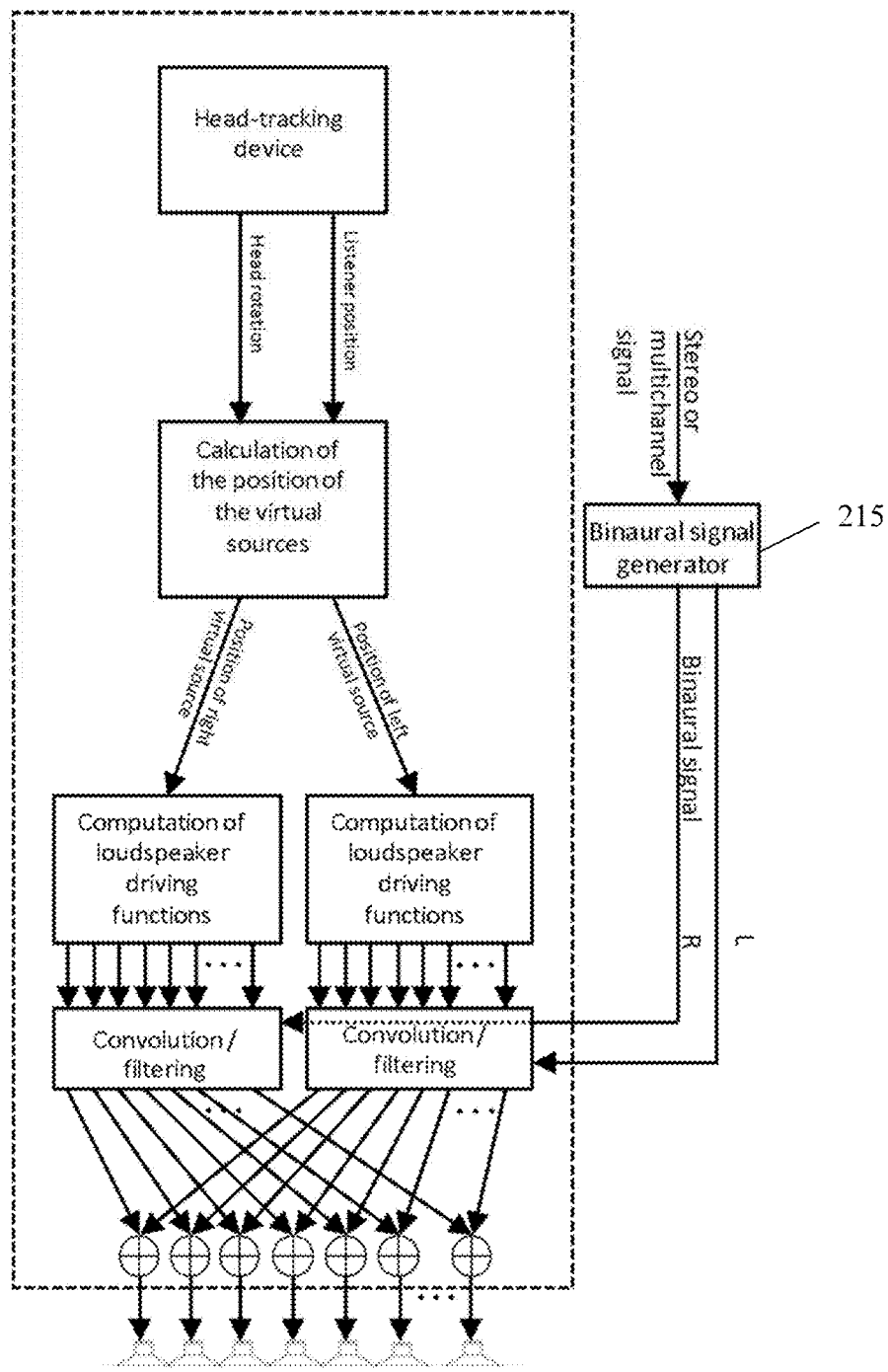
FIG. 21 shows a twelfth embodiment of the audio signal processing device according to the application.

In FIG. 21, an embodiment of the inventive audio processing device used for a rendering of multichannel audio signals is shown. For rendering a multichannel (2+, stereo, surround) audio signals, a binaural signal is generated where each channel corresponds to a virtual loudspeaker at a desired position in an auralization unit 215. A plurality of different audio sources with different content and location can be implemented into the binaural signal. Optionally, the head rotation information can be used to adapt the binaural signals to changes of the orientation of the head of the listener. The remaining processing is identical to the earlier described embodiments.

Figure 22:
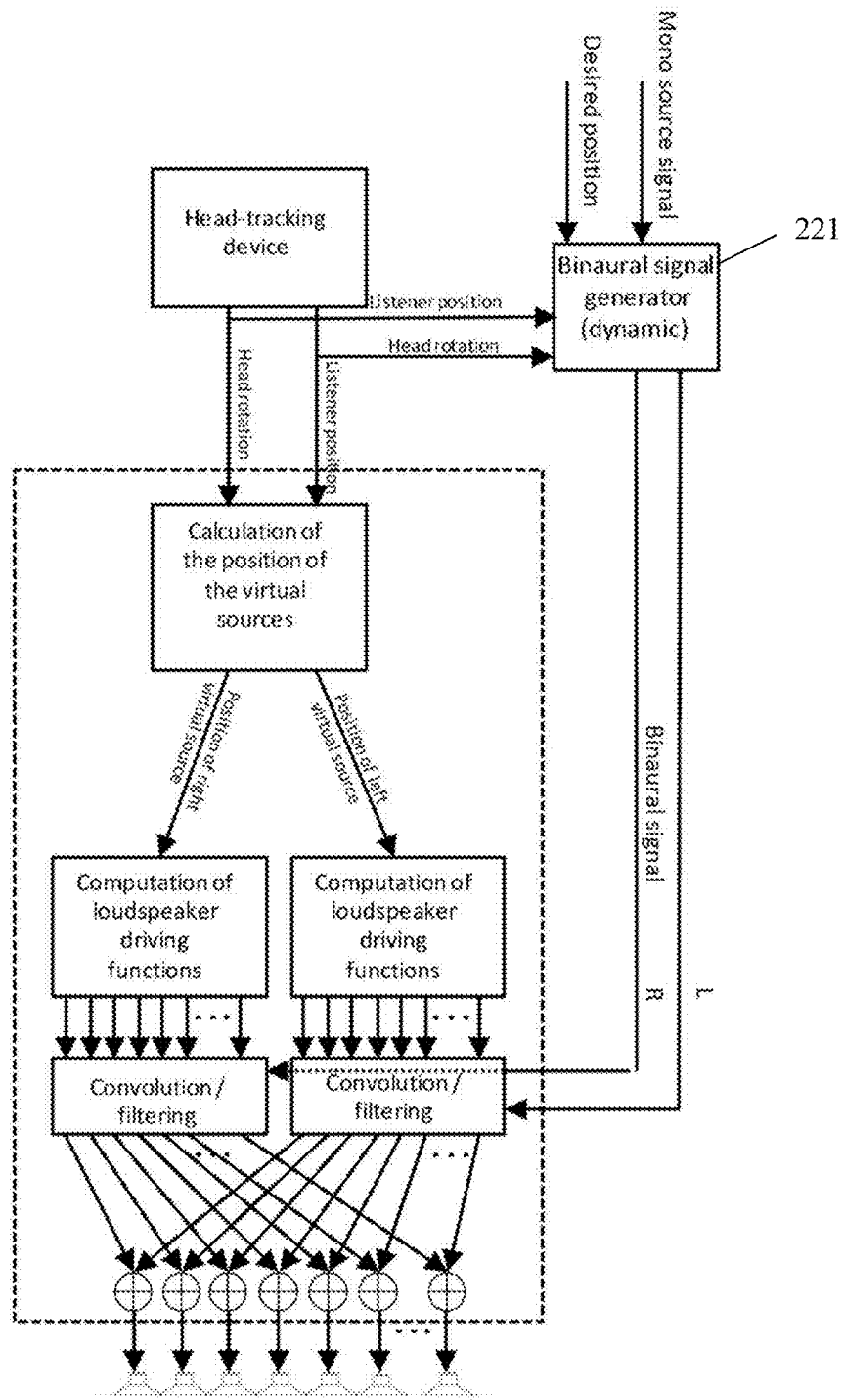
FIG. 22 shows a thirteenth embodiment of the audio signal processing device according to the application.

FIG. 22 shows an alternative embodiment of the inventive audio processing device used for a dynamic binaural rendering, which is beneficial for performing a dynamic binaural rendering of sources. A single source is shown in FIG. 22, but any number of sources is possible and also stereo or multichannel content can be reproduced using this strategy. Here, not a fixed HRTF us used for rendering a source, but the HRTF is dynamically updated depending on the information of the position of the listener, which comprises at least position and orientation of the head. As a result, the following effect is achieved. A source initially rendered, e.g., at 90 degrees left of the listener will appear at 0 degrees straight ahead of the listener after the listener turned his head by 90 degrees. This processing is performed by an auralization unit 221. Such dynamic binaural rendering greatly improves the perceptual quality of the binaural rendering. In particular, front-back confusions can be drastically reduced. Apart from the above described changes, the processing is identical to the earlier described embodiments.

In the following, the performance of embodiments of the inventive audio signal processing device and method are analyzed.

Figure 23:
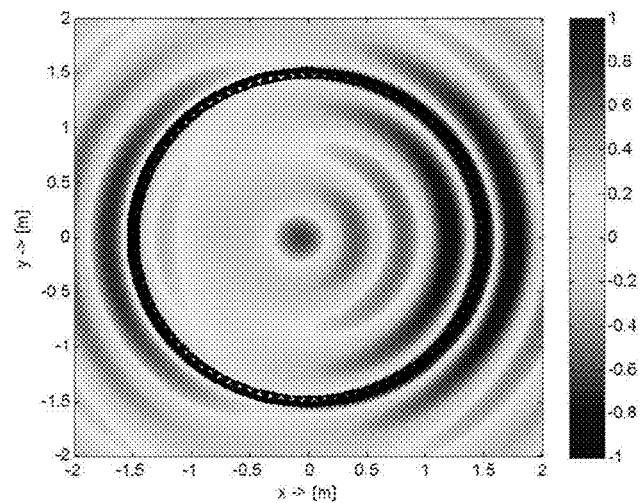
FIG. 23 shows first results of an audio level measurement using an embodiment of the audio signal processing device of the application.
Figure 24:
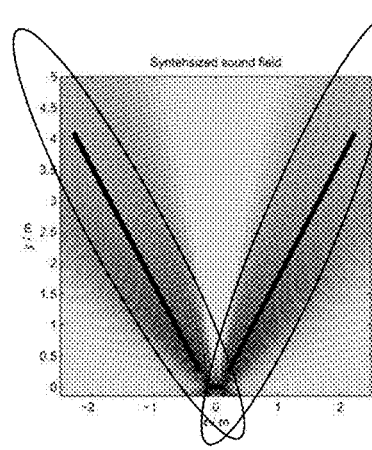
FIG. 24 shows second results of an audio level measurement using an embodiment of the audio signal processing device of the application.
Figure 25:
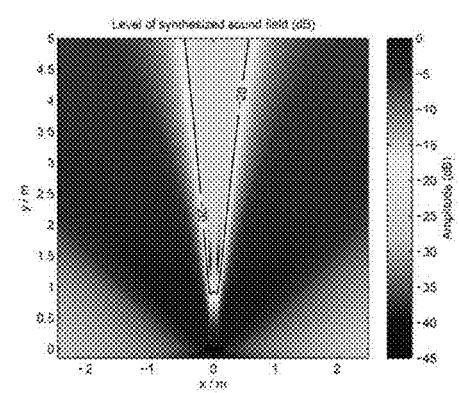
FIG. 25 shows third results of an audio level measurement using an embodiment of the audio signal processing device of the application.

In FIGS. 23, 24 and 25 the synthesis of a virtual focused source with directivity with a cardoid beam pattern is shown as superposition of a monopole and a dipole using a circular distribution of secondary sources as a specific realization of a convex loudspeaker distribution.

The application has been described in conjunction with various embodiments herein. However, other variations to the disclosed embodiments can be understood and effected by those skilled in the art in practicing the claimed application, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

What is claimed is:

1. An audio signal processing device for generating a plurality of output signals for a plurality of loudspeakers from an input audio signal, the audio signal processing device comprising:
   a hardware processor configured to:
      calculate a left soundfield for a virtual left binaural signal source and a right soundfield for a virtual right binaural signal source as a combination of multipole sources that correspond to the plurality of loudspeakers; and
      determine driving functions of the plurality of loudspeakers for generating the virtual left binaural sign source and the virtual right binaural signal source based upon a position and a directivity of the virtual left binaural signal source, a position and a directivity of the virtual right binaural signal source, and positions of the plurality of loudspeakers, and by performing a time reversal calculation for each of the multipole sources; and
   a filter coupled to the hardware processor and configured to filter a left binaural signal and a right binaural signal using the driving functions of the plurality of loudspeakers resulting in the plurality of output signals,
   wherein the left binaural signal and the right binaural signal constitute the input audio signal or are derived therefrom.

2. The device according to claim 1, wherein the hardware processor is further configured to determine the driving functions based upon preset or received positions and directivities of the virtual left binaural signal source and the virtual right binaural signal source.

3. The device according to claim 1, wherein the hardware processor is further configured to determine the positions and directivities of the virtual left binaural signal source and the virtual right binaural signal source.

4. The device according to claim 3, wherein the hardware processor is further configured to:
   track a position and orientation of a user's head; and
   determine the positions and directivities of the virtual left binaural signal source and the virtual right binaural signal source based upon the position and orientation of the user's head,
   wherein the virtual left binaural signal source is directed at the user's left ear and the virtual right binaural signal source is directed at the user's right ear, and
   wherein the virtual left binaural signal source is located in proximity to the user's left ear and the virtual right binaural signal source is located in proximity to the user's right ear.

5. The device according to claim 4, further comprising at least one visible light camera, ultrasound sensor, infrared light camera, gyroscope, or magnetic sensor configured to track the position and/or orientation of the user's head.

6. The device according to claim 1, wherein the device is configured to generate the plurality of output signals from the input audio signal and at least one further input audio signal, wherein the input audio signal and the further input audio signal are signals for two different users, wherein the hardware processor is further configured to determine the driving functions of a further virtual left binaural signal source and a further virtual right binaural signal source based upon the position and the directivity of the virtual left binaural signal source, the position and the directivity of the virtual right binaural signal source, a position and a directivity of the further virtual left binaural signal source, a position and a directivity of the further virtual right binaural signal source, and positions of the plurality of loudspeakers, wherein the filter is further configured to filter the left binaural signal, the right binaural signal, the further left binaural signal, and the further right binaural signal using the driving functions of the plurality of loudspeakers resulting in the plurality of output signals, and wherein the further left binaural signal and the further right binaural signal constitute the further input audio signal or are derived therefrom.

7. The device according to claim 1, wherein the input audio signal is a mono audio signal, and wherein the left binaural signal and the right binaural signal are derived from the mono audio signal and a mono audio signal position.

8. The device of claim 1, wherein, to filter the left binaural signal and the right binaural signal, the filter is configured to:

convolve the left binaural signal with a first subset of the driving functions resulting in a first plurality of output signals; and convolve the right binaural signal with a second subset of the driving functions resulting in a second plurality of output signals.

9. The device of claim 8, further comprising a plurality of summers configured to receive the first plurality of output signals and the second plurality of output signals, wherein at least one of the plurality of summers is configured to sum a first signal of the first plurality of output signals and a second signal of the second plurality of output signals to generate a first summed signal.

10. The device of claim 9, wherein the first summed signal is output to a first loudspeaker of the plurality of loudspeakers.

11. The device of claim 1, wherein the hardware processor is further configured to determine an interaural time difference correction based upon an interaural time difference estimation and based upon the positions of the virtual left binaural signal source and the virtual right binaural signal source.

12. The device of claim 11, wherein the hardware processor is further configured to convolve the left binaural signal and the right binaural signal based on the interaural time difference correction.

13. A system comprising:
a device;
one or more amplifiers coupled to the device; and
a loudspeaker array coupled to the one or more amplifiers,
wherein the device is configured to generate a plurality of output signals from an input audio signal,
wherein the device comprises:
a hardware processor configured to:
calculate a left soundfield for a virtual left binaural signal source and a right soundfield for a virtual right binaural signal source as a combination of multipole sources that correspond to the plurality of loudspeakers; and
determine driving functions of the plurality of loudspeakers for generating a virtual left binaural signal source and a virtual right binaural signal source based upon a position and a directivity of the virtual left binaural signal source, a position and a directivity of the virtual right binaural signal source, and positions of the plurality of loudspeakers, and by performing a time reversal calculation for each of the multipole sources; and
a filter configured to filter a left binaural signal and a right binaural signal using the driving functions of the plurality of loudspeakers resulting in the plurality of output signals,
wherein the left binaural signal and the right binaural signal constitute the input audio signal or are derived therefrom,
wherein the device is configured to provide the output signals to the one or more amplifiers,
wherein the one or more amplifiers are adapted to amplify the output signals to generate amplified output signals, and
wherein the loudspeaker array is adapted to output the amplified output signals.

14. The system according to claim 13, wherein the one or more amplifiers comprise a plurality of the amplifiers, wherein the loudspeaker array comprises a plurality of loudspeakers that are each connected to one of the plurality of amplifiers, and wherein each of the plurality of amplifiers is configured to amplify a single output signal of the output signals to generate an amplified output signal and to drive a loudspeaker connected to the amplifier to output the amplified output signal.

15. The system according to claim 13, wherein the plurality of loudspeakers is arranged 2-dimensionally surrounding a user, 3-dimensionally surrounding the user, 2-dimensionally on one side of the user, or 3-dimensionally on one side of the user.

16. The system according to claim 13, wherein the device, the one or more amplifiers, and the plurality of loudspeakers comprise a soundbar, a tablet personal computer (PC), a mobile telephone, or a telepresence system.

17. An audio signal processing method for generating a plurality of output signals for a plurality of loudspeakers from an input audio signal, the method comprising:
calculating a left soundfield for a virtual left binaural signal source and a right soundfield for a virtual right binaural signal source as a combination of multipole sources that correspond to the plurality of loudspeakers;
determining driving functions of a plurality of loudspeakers for generating a virtual left binaural signal source and a virtual right binaural signal source based upon a position and a directivity of the virtual left binaural signal source, a position and a directivity of the virtual right binaural signal source, and positions of the plurality of loudspeakers, and by performing a time reversal calculation for each of the multipole sources; and
filtering a left binaural signal and a right binaural signal using the driving functions of the plurality of loudspeakers resulting in a plurality of output signals,
wherein the left binaural signal and the right binaural signal constitute the input audio signal or are derived therefrom.

18. The method of claim 17, wherein filtering the left binaural signal and the right binaural signal comprises:
convolving the left binaural signal with a first subset of the driving functions resulting in a first plurality of output signals; and
convolving the right binaural signal with a second subset of the driving functions resulting in a second plurality of output signals.

19. The method of claim 18, further comprising:
receiving, at a plurality of summers, the first plurality of output signals and the second plurality of output signals;
summing, by a first of the plurality of summers, a first signal of the first plurality of output signals and a second signal of the second plurality of output signals to generate a first summed signal; and
outputting the first summed signal to a first loudspeaker of the plurality of loudspeakers.

* * * * *

UNITED STATES PATENT AND TRADEMARK OFFICE
CERTIFICATE OF CORRECTION

| | | |
|---|---|---|
| PATENT NO. | : 9,838,825 B2 | Page 1 of 1 |
| APPLICATION NO. | : 15/343709 | |
| DATED | : December 5, 2017 | |
| INVENTOR(S) | : Karim Helwani et al. | |

It is certified that error appears in the above-identified patent and that said Letters Patent is hereby corrected as shown below:

In the Claims

Column 15, Lines 51-67, through Column 16, Lines 1-10, Claim 1 should read:
1. An audio signal processing device for generating a plurality of output signals for a plurality of loudspeakers from an input audio signal, the audio signal processing device comprising:
    a hardware processor configured to:
        calculate a left soundfield for a virtual left binaural signal source and a right soundfield for a virtual right binaural signal source as a combination of multipole sources that correspond to the plurality of loudspeakers; and
        determine driving functions of the plurality of loudspeakers for generating the virtual left binaural signal source and the virtual right binaural signal source based upon a position and a directivity of the virtual left binaural signal source, a position and a directivity of the virtual right binaural signal source, and positions of the plurality of loudspeakers, and by performing a time reversal calculation for each of the multipole sources; and
    a filter coupled to the hardware processor and configured to filter a left binaural signal and a right binaural signal using the driving functions of the plurality of loudspeakers resulting in the plurality of output signals,
    wherein the left binaural signal and the right binaural signal constitute the input audio signal or are derived therefrom.

Signed and Sealed this
Nineteenth Day of June, 2018

Andrei Iancu
*Director of the United States Patent and Trademark Office*